United States Patent [19]
Hayes-Jacobson et al.

[11] Patent Number: 5,997,932
[45] Date of Patent: Dec. 7, 1999

[54] SYSTEM FOR APPLYING FLUID STRIP TO DOUGH

[75] Inventors: Susan M. Hayes-Jacobson, Minneapolis; James P. Michaels, Blaine, both of Minn.

[73] Assignee: Pillsbury Company, Minneapolis, Minn.

[21] Appl. No.: 08/966,106

[22] Filed: Nov. 7, 1997

Related U.S. Application Data

[62] Division of application No. 08/720,027, Sep. 27, 1996, Pat. No. 5,862,744.

[51] Int. Cl.$^6$ .............................. A21D 13/00; A23G 3/00
[52] U.S. Cl. ......................... 426/502; 426/94; 426/275; 426/496
[58] Field of Search ............................... 55/450.7, 450.6, 55/450.2, 516, 534, 450.1; 426/84, 275, 297–549

[56] References Cited

U.S. PATENT DOCUMENTS

| | | | |
|---|---|---|---|
| 1,414,022 | 4/1922 | Huston | 426/94 |
| 2,919,673 | 1/1960 | Williams et al. | 118/8 |
| 2,956,905 | 10/1960 | Jones et al. | 117/120 |
| 2,960,060 | 11/1960 | Chatterton | 118/24 |
| 2,977,924 | 4/1961 | Bender et al. | 118/8 |
| 3,026,822 | 3/1962 | Gatti | 426/94 |
| 3,292,573 | 12/1966 | Jones | 118/7 |
| 3,360,202 | 12/1967 | Taylor et al. | 239/455 |
| 3,793,938 | 2/1974 | Haas | 99/450.6 |
| 3,867,559 | 2/1975 | Haas | 426/283 |
| 4,093,125 | 6/1978 | Shatila et al. | 239/553.3 |
| 4,910,661 | 3/1990 | Barth et al. | 364/167.01 |
| 4,992,285 | 2/1991 | Larson | 426/297 |
| 5,063,068 | 11/1991 | Cavanagh | 426/94 |
| 5,407,697 | 4/1995 | Buecher et al. | 427/11 |

*Primary Examiner*—Leslie Wong
*Assistant Examiner*—Hao Mai
*Attorney, Agent, or Firm*—Westman, Champlin & Kelly, P.A.

[57] ABSTRACT

Method and apparatus applies a strip or stream of fluid to a moving dough sheet. The apparatus has a fluid flow regulator coupled to a fluid source providing positive pressure, and a nozzle coupled to the fluid flow regulator and disposed proximate the dough sheet such that drops of fluid emerging from the nozzle contact the dough sheet before falling from the nozzle.

5 Claims, 5 Drawing Sheets

SYSTEM FOR APPLYING FLUID STRIP TO DOUGH

This is a divisional of application Ser. No. 08/720,027, filed Sep. 27, 1996 now U.S. Pat. No. 5,862,744.

BACKGROUND OF THE INVENTION

The present invention relates to dough processing machinery. More specifically, the present invention relates to a system for applying a fluid strip to a moving dough sheet.

In dough processing, it is often desirable to bond two or more layers of dough together. For example, in the manufacture of filled dough products a filling is applied to a moving dough sheet. The dough sheet is then folded over upon itself, and crimped or sealed in another suitable manner. For doughs of a drier nature, which are preferred for their sensory attributes when cooked, however, a bond imparted by crimping alone is usually not sufficient to withstand the stresses of cooking, handling, and eating; thus, leaks develop. Splitting of the seams and leaking of the filling are serious consumer issues with filled dough products. To increase the effectiveness of the bond of the seams, attempts have been made to apply fluid to the surface of the dough.

The application of fluid to a moving dough sheet has traditionally been accomplished by means of an atomizing spray, a waterfall, or by droplets. However, all methods pose problems either because of the excess amount of fluid applied or because of inadequate coverage of the fluid.

The spraying method does not allow precise control of the amount of fluid actually delivered to the dough because only a portion of the fluid is actually delivered to the dough surface. The amount actually delivered to the dough varies, depending on the relative humidity. Generally, more fluid is required to be supplied than is actually delivered. Also, the spraying method atomizes the fluid which causes tiny airborne droplets to reside in the area of production. This enhances the possibility of microbial growth and contaminants contacting the dough, and can increase the humidity in the processing environment. Increased moisture is particularly detrimental in processing areas that are preferably kept dry or where humidity is carefully controlled for optimum performance. Additionally, in a dough processing plant a fine layer of flour usually exists on virtually all surfaces and atomizing spray tends to turn the fine layer of flour into a sticky layer which is not only aesthetically undesirable, but also contributes to microbial growth. These microbial concerns create food safety problems with the use of sprays in food manufacturing applications. One alternative to the spraying method is described in a co-pending application entitled "LIQUID DISTRIBUTION APPARATUS FOR A DOUGH PROCESSING LINE" filed on even date herewith having Ser. No. 08/720,023, now U.S. Pat. No. 5,855,670.

The waterfall method, although not subject to the food safety concerns of the spray method, has problems of its own. The waterfall method requires the application of a steady stream of fluid. The minimum amount of fluid required to apply a steady stream is more than the maximum amount of fluid that the dough can accept without adverse consequences. The resulting over hydration yields gummy sensory attributes in the dough making the dough difficult to work with. The excess water also exacerbates concerns related to microbial growth.

The fluid droplet method is similar to the waterfall method except that, instead of applying a steady stream of fluid to the dough, discrete drops of fluid are provided to the dough. If the frequency of the drops is low enough, the dough does not become over-hydrated as it does with the waterfall method. However, applying discrete fluid droplets at such a low frequency results in inconsistent coverage. In other words, using the fluid droplet method, it is very difficult to obtain a consistent and continuous fluid strip along the dough surface without over hydrating the dough.

SUMMARY OF THE INVENTION

An apparatus applies a strip of fluid to a dough sheet. The apparatus includes an adjustable fluid flow regulator coupled to a fluid source providing positive pressure, and a nozzle coupled to the adjustable fluid flow regulator and disposed proximate the dough sheet such that a steady strip or stream of fluid emerging from the nozzle contacts the dough sheet before falling from the nozzle.

DETAILED DESCRIPTION OF THE PREFERRED EMBODIMENTS

Figure 1:
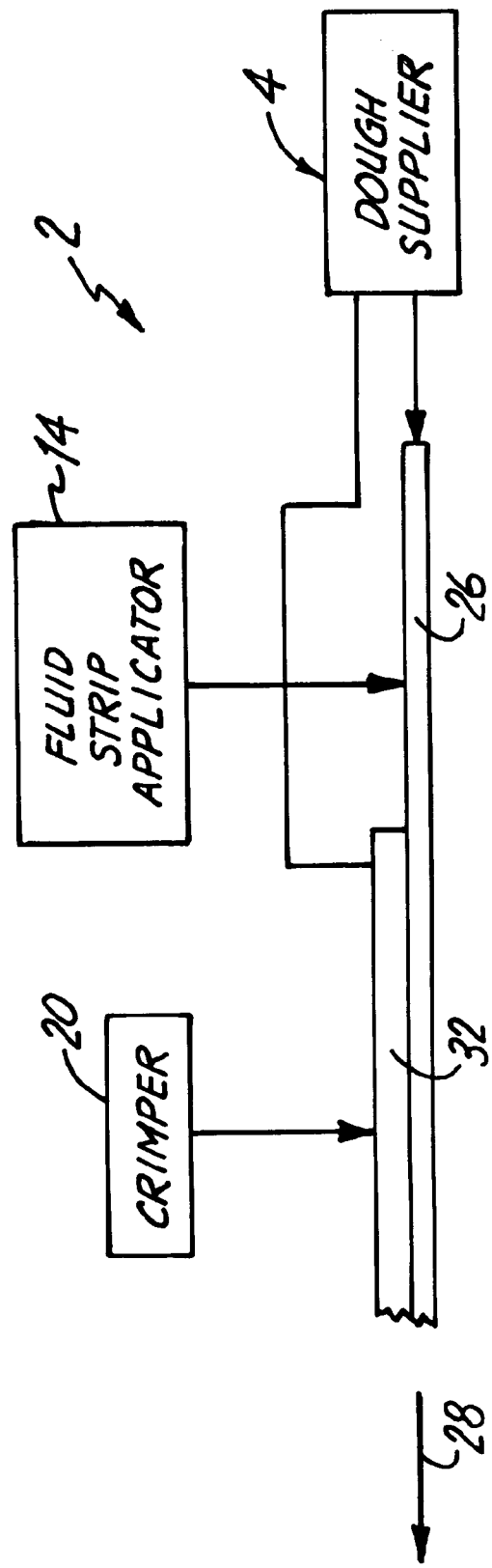
FIG. 1 is a block diagram of a portion of a dough processing system according to the present invention.

FIG. 1 is a simplified block diagram of a dough processing system 2 utilizing the present invention. Dough processing system 2 includes dough supplier 4, fluid strip applicator 14 and crimper 20. Dough supplier 4 can be any number of types of dough supplying equipment, such as a dough sheeter, or an extruder, or any other device for providing dough. In the system 2 shown in FIG. 1, dough supplier 4 provides a dough sheet 26. Dough sheet 26 is moved along a dough travel path indicated by arrow 28.

Fluid strip applicator 14, in accordance with the present invention, provides at least one fluid strip on the surface of dough sheet 26. In one preferred embodiment, the fluid applied by fluid strip applicator 14 is water which assists in connecting two dough sheets together. The fluid is preferably an aqueous solution having viscosity of less than approximately 100 centipoise.

After the strip of fluid is applied by fluid strip applicator 14, a second portion of dough (or dough sheet) 32, (which in this preferred embodiment is a second sheet of dough either supplied by dough supplier 4, or supplied by folding sheet 26 over upon itself, or supplied in any other suitable manner) is provided. Sheet 32 is then crimped to sheet 26 by crimper 20. In the preferred embodiment, crimper 20 can be any suitable crimper, such as a stamper, a weighted wheel, a docker, or any other suitable system. Because the fluid strip supplied by fluid strip applicator 14 provides a strip of water on the surface of dough sheet 26, without over hydrating dough sheet 26, the connection between dough sheets 26 and 32 made by crimper 20 is enhanced without the deleterious effects which accompany over-hydration. The crimped dough then continues along dough travel path 28 for further processing.

Figure 2:
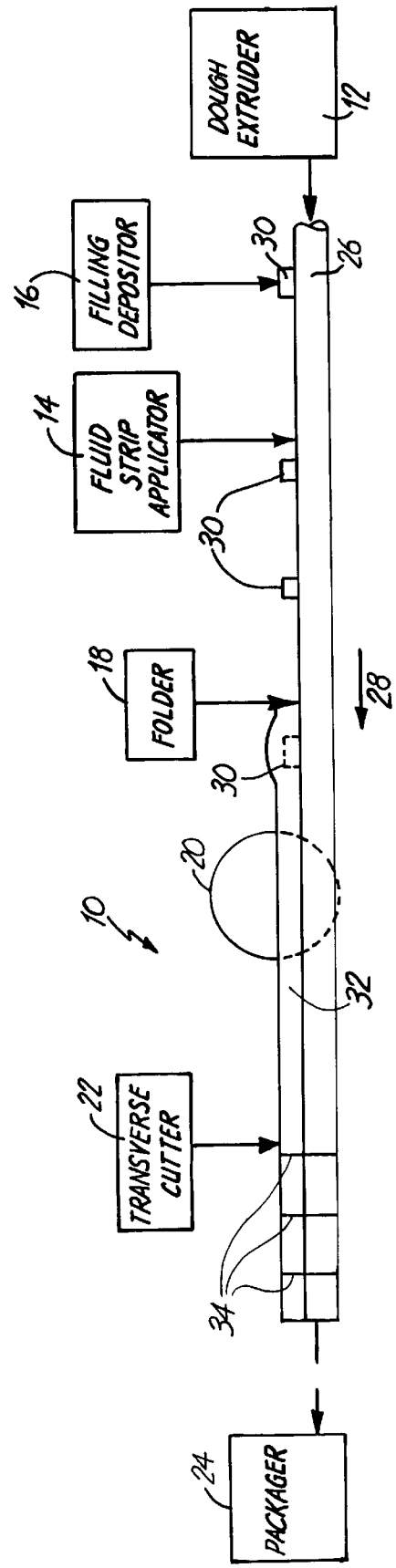
FIG. 2 is a block diagram of a more detailed, filled dough processing system according to the present invention.

FIG. 2 shows filled dough processing system 10 in block diagram form. System 10 shows a more specific implementation of the present invention and includes extruder 12, fluid strip applicator 14, filling depositor 16, folder 18, cutter/ crimper 20, transverse cutter 22, and packager 24. Extruder 12 is of conventional design, and provides an extruded dough sheet 26. Dough sheet 26 moves along the dough travel path in a direction indicated by arrow 28 under the influence of a suitable driving mechanism such as conveyors (not shown).

Filling depositor 16 is of conventional design, and deposits filling 30 on the surface of dough sheet 26. Filling 30 can be meat, cheese, fruit, confections, or some other suitable filling material. Filling 30 can be deposited in a number of configurations including filling cubes or strips. Also, other suitable filling depositors could be used.

As stated with respect to FIG. 1, applicator 14 applies fluid strips, typically water, to dough sheet 26, and will be shown in greater detail in later drawings. The fluid strips assist in bonding the dough sheet, as will be described in greater detail later in the specification.

Folder 18 is also of conventional design (such as a folding plough), and folds dough sheet 26 over upon itself creating the second layer 32. Filling 30 is then enrobed between dough sheet 26 and layer 32.

Cutter/crimper 20 crimps both layers of dough 26, 32 together by applying pressure to dough adjacent the fluid strips. Simultaneously, cutter/crimper 20 cuts away excess dough. Of course, in another embodiment, the cutting and crimping operations can be performed separately. Cutter/ crimper 20 is also discussed in greater detail with respect to FIG. 5.

Transverse cutter 22 is also a conventional cutter, such as a guillotine-type cutter. Cutter 22 provides transverse cuts 34 which extend through both dough layers, in a direction transverse to travel path 28; thus creating discrete filled dough pieces.

The filled dough pieces can then be further processed, or packaged. In the embodiment shown in FIG. 2, packager 24, which is of conventional design, packages the filled dough product. Any suitable packager or packaging system can be used.

Figure 3:
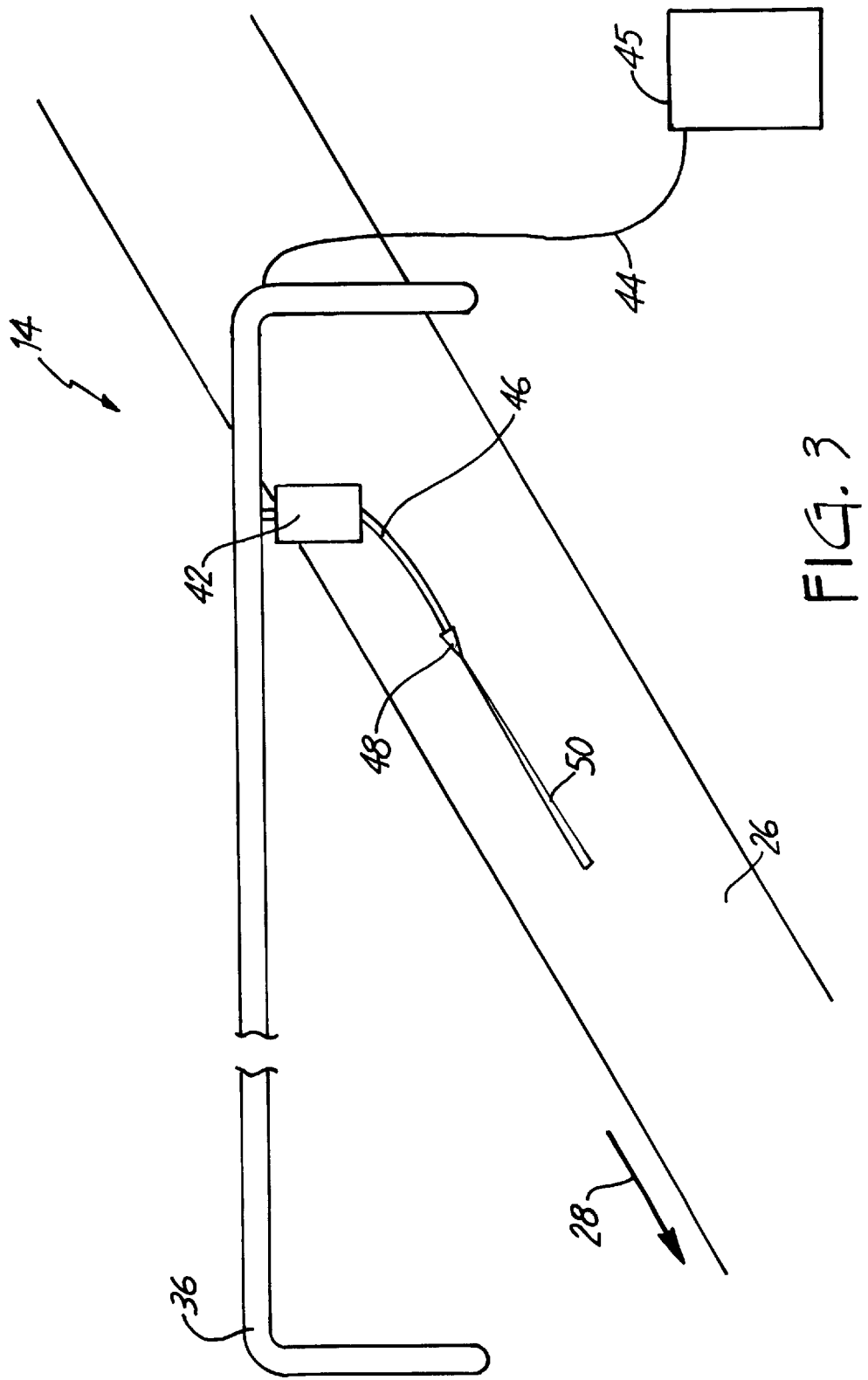
FIG. 3 is a top perspective view of an apparatus for applying a fluid strip to dough, as shown in FIG. 1.

FIG. 3 is a top perspective view showing one embodiment of applicator 14 in greater detail. In the embodiment shown in FIG. 3, applicator 14 includes support 36, regulator 42, neck 46 and nozzle 48. Support 36 preferably transversely spans an area above dough sheet 26. Of course, any number of supports can be used, supporting any number of regulators, necks, and nozzles, depending on the number of fluid strips desired and the number of supports desired.

In the embodiment of FIG. 3, regulator 42 is mounted to support 36 and is coupled to a fluid source which provides low positive fluid pressure through conduit 44 and shut-off valve 45. In the preferred embodiment, shut-off valve 45 is an electronically actuated valve that receives an actuation signal in the form of feedback from the conveyor system. Valve 45 can be any suitable valve.

Neck 46, constructed from a flexible shape-retaining material, is coupled to regulator 42 and extends downwardly therefrom. Neck 46 is preferably formed of a goose-neck or tube type design. Nozzle 48 is preferably plastic or stainless-steel and is removably coupled to neck 46. Nozzle 48 is preferably disposed spaced from dough sheet 26, but proximate dough sheet 26 such that fluid emerging from nozzle 48 contacts dough sheet 26 before it drops from nozzle 48 and hence before a discrete droplet forms, thereby providing fluid strip 50. Nozzle 48 is preferably disposed as far away from the dough as possible, but close enough so that discrete droplets do not form. This has been observed to be within approximately 3 mm of moving dough sheet 26, but typically between approximately 1 mm and 3 mm, depending on the flow rate of water through nozzle 48.

In operation, the flow rate of fluid emerging from a nozzle is adjusted with its corresponding regulator. Preferably, adjusting the fluid flow from a nozzle is accomplished by first lifting the nozzle to a height of about 1 inch above the moving dough sheet. The drop rate is observed and the interval between drops is determined. The fluid regulator is adjusted to obtain a desired interval between drops. Once the desired interval is obtained, the nozzle is returned to its close proximity to dough sheet 26. The fluid flow rate has been observed to preferably be approximately one drop per lineal inch of dough to result in a steady stream of fluid being applied to dough sheet 26 when the nozzle is returned to its close proximity to dough sheet 26.

Figure 4:
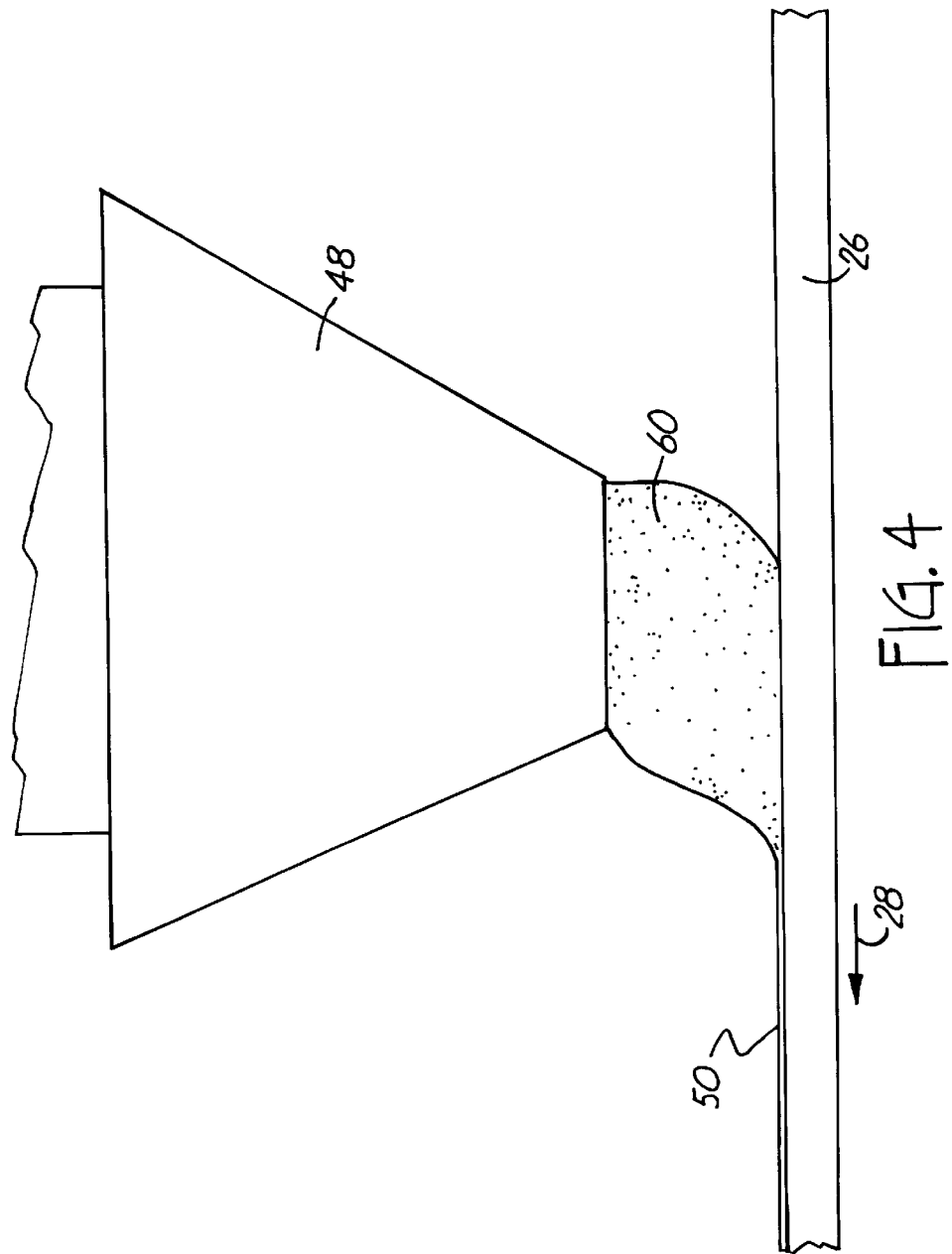
FIG. 4 is an enlarged side elevation view of a nozzle shown in FIG. 3.

FIG. 4 is an enlarged side elevation view of one of the nozzles 48 as shown in FIG. 3. A drop of fluid 60 emerging from nozzle 48 but which has not yet dropped from the nozzle to form a discrete droplet, contacts the surface of dough sheet 26. The surface tension of fluid 60, such as water, is such that the drop is suspended between the end of nozzle 48 and the dough surface. As shown in FIG. 4, a portion of the fluid in the drop adjacent the dough surface is pulled away from the drop by the moving dough sheet 26, to form fluid strip 50. Because only a very small portion of fluid 60, rather than an entire drop of fluid, is being applied to any given surface area of dough sheet 26, the dough receives sufficient fluid, which is evenly distributed to form a thin strip or film, to form a strong bond, without becoming over-hydrated. It has been observed that by using this system, less than about 5%, and preferably less than about 1%, of the drop of fluid 60 is applied to any given surface area of the dough. The amount of fluid applied to the dough surface is comparable to the amount applied by atomization, but without the disadvantages of an atomizing system.

Figure 5:
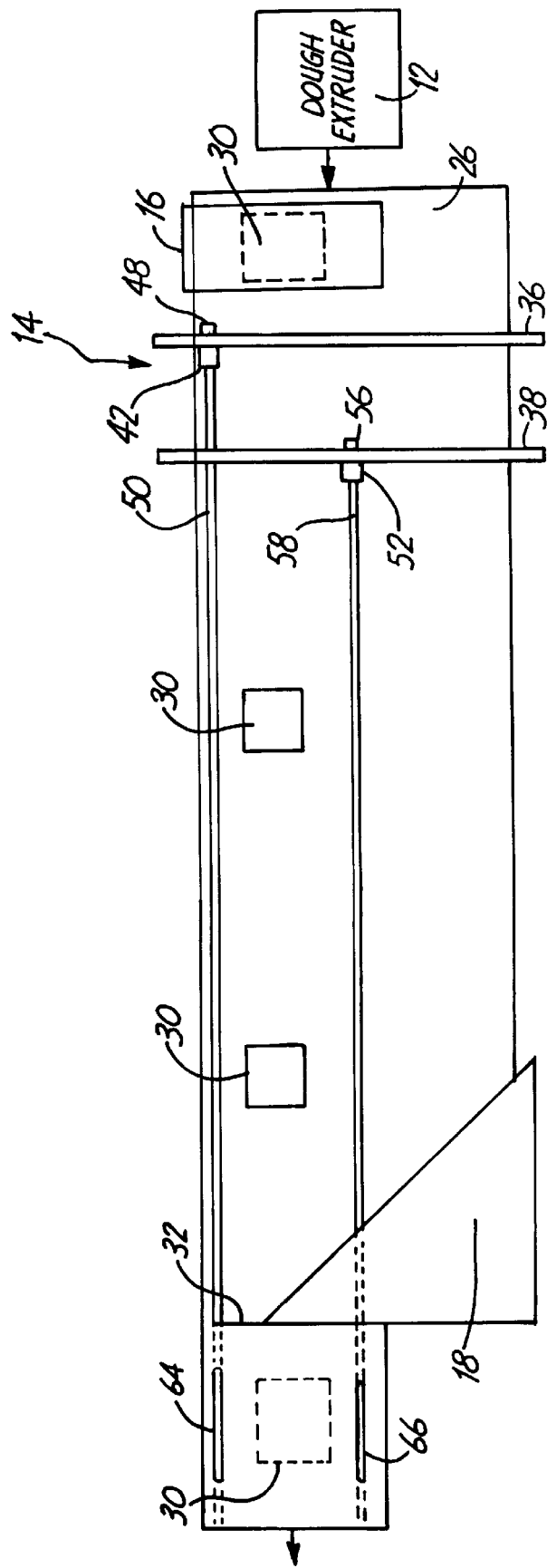
FIG. 5 is a top plan view of the filled dough processing system of FIG. 2 depicted in partial block diagram form.

FIG. 5 is a partial top plan view of the dough processing system as shown in FIG. 2, in partial block diagram form. Filling portions 30 are disposed on dough sheet 26 between first fluid strip 50 and a second fluid strip 58 applied in the same way as fluid strip 50, using a second applicator 14, through second regulator 52 and second nozzle 56, attached on second support 38. First cutter/crimper 64 and second cutter/crimper 66 is preferably of the design detailed in U.S. patent application Ser. No. 08/654,980, now abandoned, entitled MULTILAYER DOUGH ADHESION and assigned to the same assignee as the present invention. First cutter/ crimper 64 is disposed directly above first fluid strip 50, and is adapted to roll along first fluid strip 50. Second cutter/ crimper 66 is axially aligned with first cutter/crimper 64 and is disposed directly above second fluid strip 58 and inwardly from the folded edge of dough sheet 26.

Because cutter/crimper wheels 64, 65 are transversely fixed relative to the dough travel path, and transverse dough sheet alignment can vary slightly, correct transverse positioning of nozzles 48, 56 is important. When nozzles 48, 56 are transversely positioned correctly, fluid strips 50, 58 pass directly under cutter/crimper wheels 64, 66, respectively. Such alignment allows high pressure created by cutter/ crimper wheels 64, 66 to be focused on the portion of dough on which fluid strips 50, 58, are applied. The high pressure created by cutter/crimper 64, 66 coupled with the enhanced adhesive properties of moistened dough creates a bond between the dough layers, the strength of which exceeds that of prior systems.

Also, the position of dough sheet 26 on the conveyor, after it is provided by dough extruder 12, can change transversely with respect to the dough travel path. This change in the relative position of the dough sheet 26 along the dough processing line is referred to as wandering. It is very difficult, if not impossible, to move dough sheet 26 transversely on the conveyors once it is extruded. Therefore, in prior systems it was very difficult to offset the effects of wandering. However, by providing necks 46 and 56 on the fluid applicator, which are flexible in nature and also shape retaining, the relative transverse position of nozzles 48 and 56 can be easily adjusted to accommodate for wandering in a very quick and efficient manner. If wandering is minimized or eliminated, necks 46 and 56 need not be flexible and can instead be made of any rigid material.

As seen in FIG. 5, more than one fluid strip can be applied to a dough sheet by installing another applicator to the dough processing line. In the embodiment shown in FIG. 5, the second applicator is attached to a second support 38. Alternatively, the second applicator can be installed onto the same support as the first applicator.

The figures show a system for applying a fluid strip to one sheet of dough. More than one sheet of dough can be processed at the same time on a second conveyor parallel to the first conveyor by installing applicators on a support that spans across the width of both conveyors. As indicated by the broken lines in FIG. 3, the support can be of any width to accommodate any number of applicators to apply fluid to any number of dough sheets.

As can be appreciated by those skilled in the art, fluid strips may be applied to any reasonable number of dough sheets by merely adding more regulators, necks and nozzles.

Therefore, the present invention provides a fluid strip applicator which uses very little water, and therefore avoids the problems associated with over hydration, but which also applies a fluid strip which provides adequate coverage of the dough sheet to which it is applied. This allows the crimper to effectively crimp and seal the two dough sheets together.

Although the present invention has been described with reference to preferred embodiments, workers skilled in the art will recognize that changes may be made in form and detail without departing from the spirit and scope of the invention. For example, although the invention has been described with reference to two fluid strips, the invention may be practiced with only one fluid strip where the fold itself creates the second seal.

What is claimed is:

1. A method of crimping dough product, comprising:

moving a first dough portion along a travel path;

applying to the first dough portion as the first dough portion moves along the travel path a strip of fluid in a non-atomizing fashion in a manner which avoids formation of discrete fluid droplets during application of the fluid strip to the first dough portion;

providing a second dough portion adjacent the fluid strip on the first dough portion; and crimping the first and second dough portions along the fluid strip.

2. The method of claim 1 and further comprising:

depositing a portion of filling material on the surface of the first dough portion; and wherein providing the second dough portion enrobes the filling material between the first and second dough portions.

3. The method of claim 1 wherein providing a second dough portion comprises:

folding the first dough portion over on itself.

4. The method of claim 1 wherein applying a fluid strip to the first dough portion further comprises:

providing a fluid flow;

providing a neck having an inlet and an outlet, the inlet configured to receive the fluid flow;

providing a nozzle coupled to the outlet of the neck; and positioning the nozzle proximate the first dough portion to apply the fluid strip.

5. The method of claim 4 wherein positioning the nozzle comprises:

positioning the neck so the nozzle is positioned relative to the dough sheet such that drops of fluid emerging from the nozzle contact the moving dough sheet before falling from the nozzle.

\* \* \* \* \*